(12) United States Patent
Schoenfelder et al.

(10) Patent No.: US 12,546,964 B2
(45) Date of Patent: Feb. 10, 2026

(54) SYSTEMS AND METHODS FOR MANAGING CABLES

(71) Applicant: CommScope Technologies LLC, Hickory, NC (US)

(72) Inventors: Rodney C. Schoenfelder, Shakopee, MN (US); Jed J. Hunsader, Belle Plaine, MN (US)

(73) Assignee: COMMSCOPE TECHNOLOGIES LLC, Claremont, NC (US)

( * ) Notice: Subject to any disclaimer, the term of this patent is extended or adjusted under 35 U.S.C. 154(b) by 303 days.

(21) Appl. No.: 18/247,034

(22) PCT Filed: Sep. 28, 2021

(86) PCT No.: PCT/US2021/052409
§ 371 (c)(1),
(2) Date: Mar. 28, 2023

(87) PCT Pub. No.: WO2022/067250
PCT Pub. Date: Mar. 31, 2022

(65) Prior Publication Data
US 2023/0375796 A1    Nov. 23, 2023

Related U.S. Application Data

(60) Provisional application No. 63/084,396, filed on Sep. 28, 2020.

(51) Int. Cl.
*G02B 6/00* (2006.01)
*G02B 6/44* (2006.01)

(52) U.S. Cl.
CPC ...... *G02B 6/44524* (2023.05); *G02B 6/44526* (2023.05)

(58) Field of Classification Search
CPC ... G02B 6/44524; G02B 6/44526; G02B 6/00
See application file for complete search history.

(56) References Cited

U.S. PATENT DOCUMENTS

| | | | |
|---|---|---|---|
| 4,818,054 A | 4/1989 | George et al. | |
| 9,829,642 B2* | 11/2017 | Geens | G02B 6/2553 |
| 10,436,999 B2* | 10/2019 | Amaya Cruz | G02B 6/4452 |
| 2009/0091909 A1 | 4/2009 | Follingstad et al. | |
| 2016/0077298 A1 | 3/2016 | Wiltjer et al. | |
| 2018/0224621 A1 | 8/2018 | Campbell et al. | |
| 2018/0335595 A1 | 11/2018 | Takeuchi et al. | |
| 2019/0113704 A1 | 4/2019 | Potter et al. | |
| 2019/0250351 A1 | 8/2019 | Yamauchi et al. | |
| 2019/0250355 A1 | 8/2019 | Sledzinksi | |

OTHER PUBLICATIONS

International Search Report and Written Opinion for Application No. PCT/US2021/052409 mailed Jan. 10, 2022.
Supplementary European Search Report from the European Patent Office dated Oct. 8, 2024, for European Application No. 21873639.

* cited by examiner

*Primary Examiner* — Jennifer Doan
(74) *Attorney, Agent, or Firm* — Merchant & Gould P.C.

(57) ABSTRACT

A system for managing telecommunications cables includes a cable guide bracket mounted separate from a panel. The adjustable cable guide bracket provides more cable openings than would normally fit on the panel.

20 Claims, 10 Drawing Sheets

SYSTEMS AND METHODS FOR MANAGING CABLES

CROSS-REFERENCE TO RELATED APPLICATION

This application is a National Stage Application of PCT/US2021/052409, filed on Sep. 28, 2021, which claims the benefit of U.S. Patent Application Ser. No. 63/084,396, filed on Sep. 28, 2020, the disclosures of which are incorporated herein by reference in their entireties. To the extent appropriate, a claim of priority is made to each of the above disclosed applications.

BACKGROUND

As fiber optic and other communications networks have expanded, there is a need to distribute and manage multiple cables in a variety of situations. When connecting multiple cables, particularly fiber optic cables, it is desirable to route cables through panels that include fiber splicing trays and space for excess cable storage.

SUMMARY

The present invention is directed generally to systems and methods for organizing and managing cables. In particular, the present invention relates to a system and method of managing a plurality of fiber optic cables using fiber optic panels.

The system includes at least one panel. The panel has an interior and a plurality of sides. A cable passage is disposed on one of the sides and provides access to the interior. A cable guide bracket that includes a cable opening is positioned spaced from and near the panel such that each cable opening provides passage for one cable and is positioned parallel to one of the sides of the panel. A cable passes through one of the cable openings and further through the cable passage into the interior of the panel. Finally, a cable gland is attached to each cable. The cable gland is also attached to the cable guide bracket to restrict movement of the cable in relation to the cable guide bracket.

In another embodiment, a frame includes a plurality of uprights with a panel mounted to at least two of the uprights. The panel includes an interior, a plurality of sides, and a cable passage disposed on one of the sides that provides access to the interior. A cable guide bracket mounted is to one of the uprights and includes a planar portion defining a plurality of cable openings through the planar portion. The planar portion also includes an edge, wherein each cable opening extends to the edge and provides passage for a cable. The planar portion is spaced from the side including the cable passage outside of the interior of the panel. The planar portion is further positioned parallel to the side including the cable passage.

At least one of a plurality of cables passes through one of the cable openings and the cable passage into the interior of the panel. A cable gland is attached to each of the cables of the plurality of cables and each of the cable glands is attached to the cable guide bracket to restrict movement of the cables in relation to the cable guide bracket.

DETAILED DESCRIPTION

Turning now to the drawings, the present invention relates to a system and method for managing a plurality of cables routed into a panel. In particular, the system provides a bracket that provides cable holders for cables entering the panel. FIGS. 1-10 show one embodiment of a cable management system 10. The embodiment shown in FIGS. 1-10 is merely illustrative and any other suitable configuration may be used without departing from the invention.

Cables may be secured by glands, which hold the cables in place. However, the number of glands that can be attached to a panel may be limited by the physical sizes of the panel and the glands.

Some fiber optic cables may include multiple individual fibers in one cable, so a panel with limited space for glands may be able to accommodate many more individual fibers than cables. This size limitation can become an issue related to the glands, however, because the cables may be narrower than the glands. As a result, there may be situations where it is desirable to use such a high cable density panel with low density cable. As such, it is desirable to be able to insert more cables into a panel than it can typically accommodate.

Figure 1:
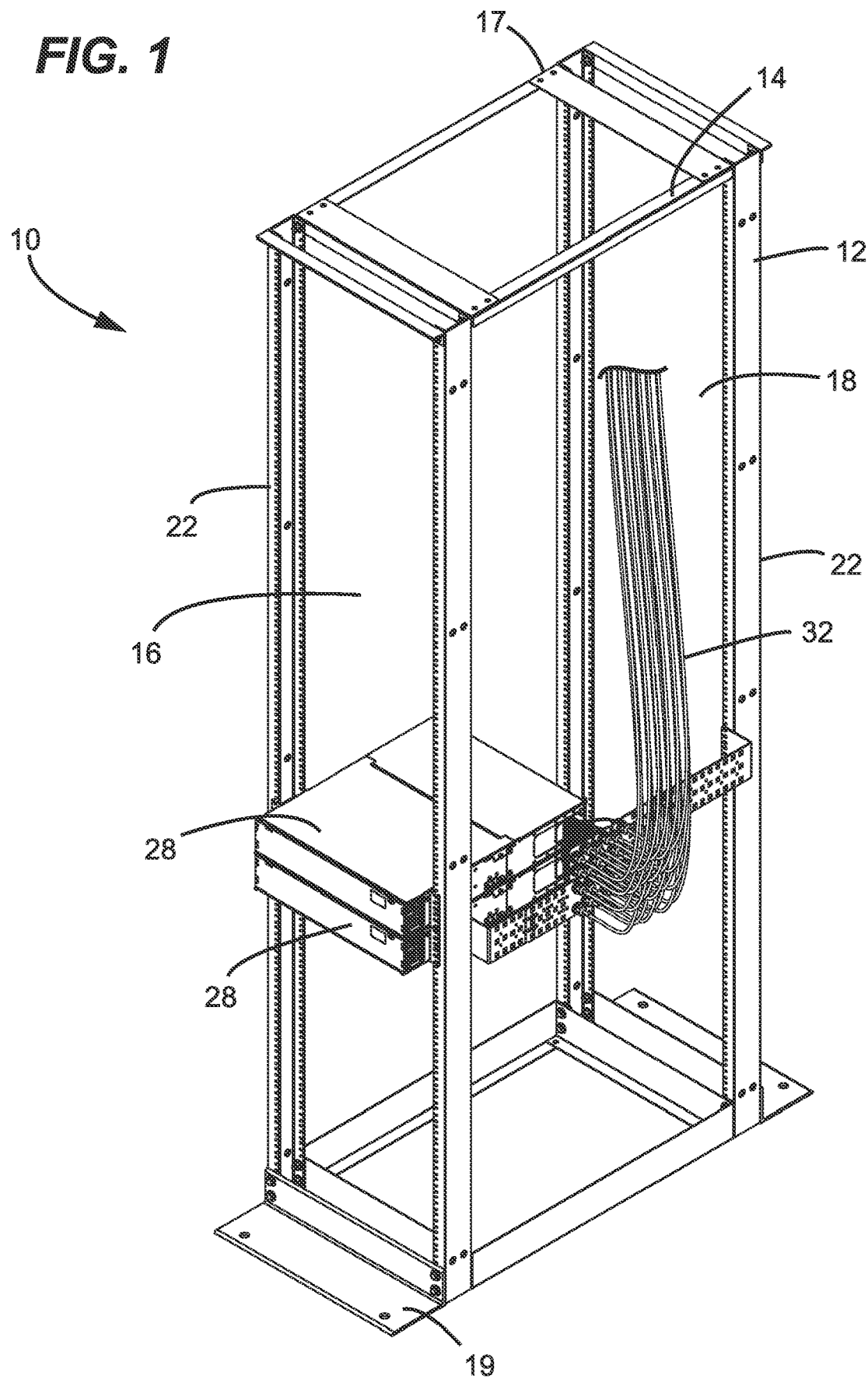
FIG. 1 is a perspective view of one embodiment of a system for managing fiber optic cable in accordance with the invention showing two fiber optic panels and cable guide brackets mounted to a rack.
Figure 2:
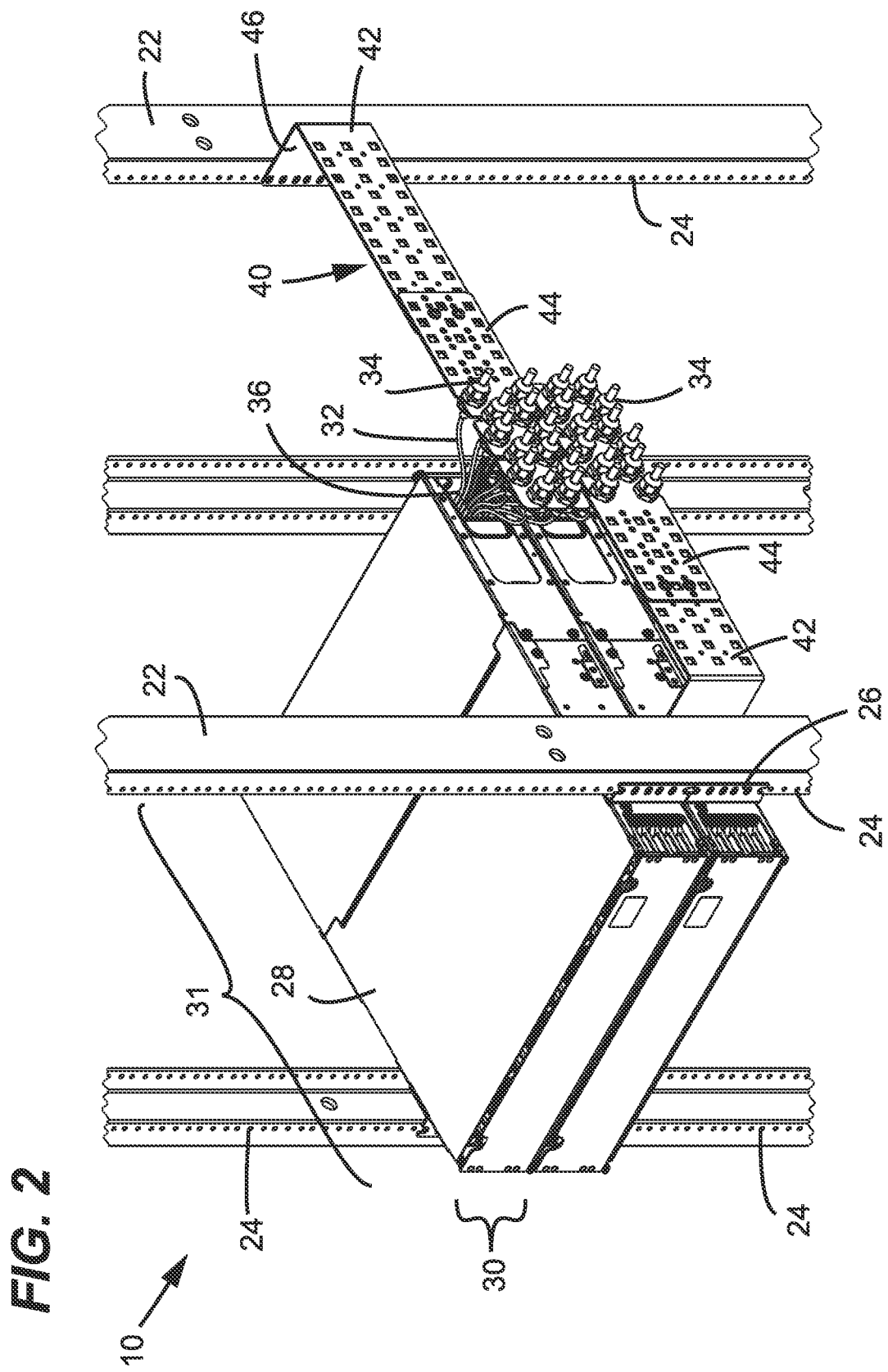
FIG. 2 is another perspective view of the system of FIG. 1, showing the system in greater detail.
Figure 3:
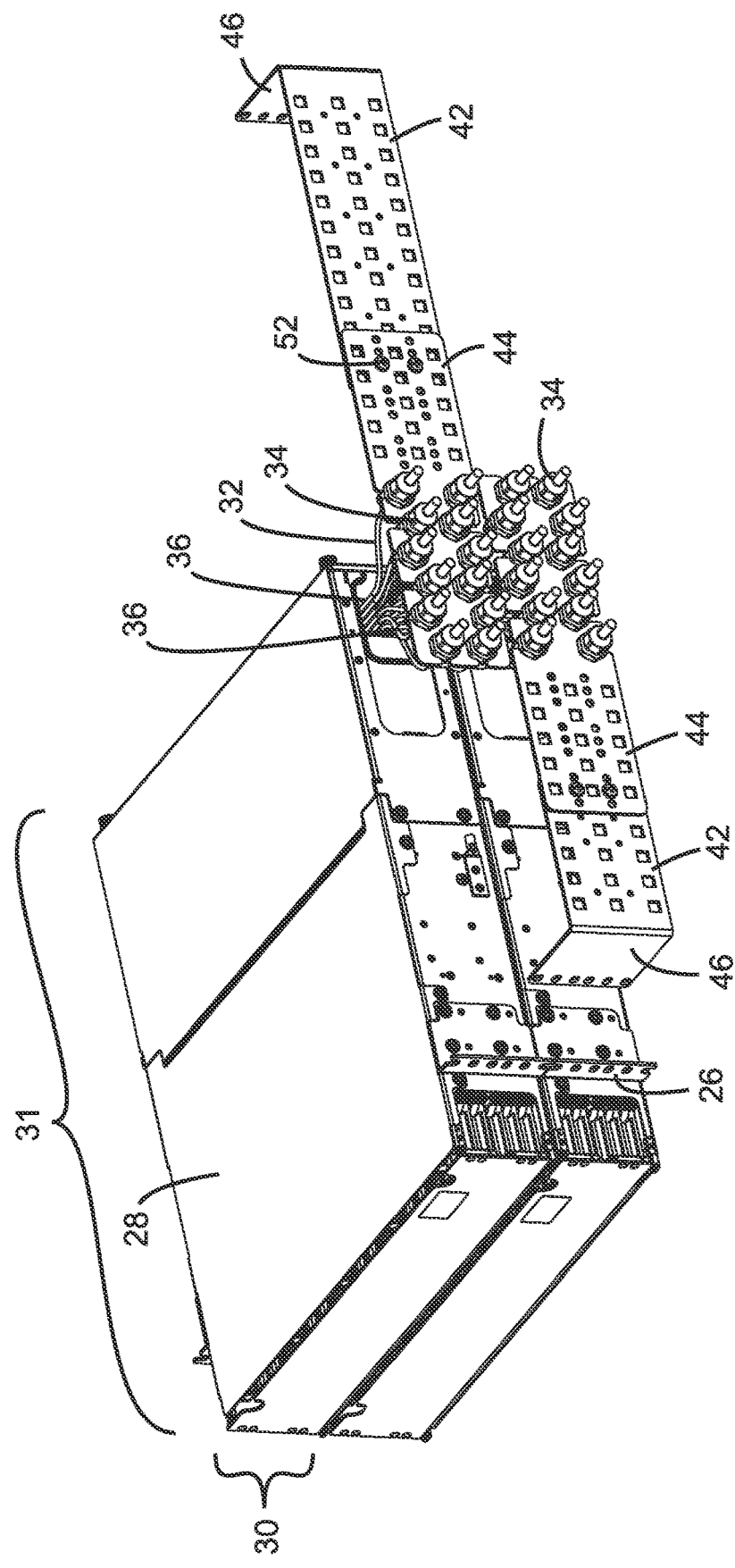
FIG. 3 is another perspective view of the system of FIG. 1, showing the panels and cable guide brackets with the rack removed.

As shown in FIG. 1, cable management system 10 includes a rack 12 including a frame 14. Frame 14 has a front 16, a top 17, a rear 18, a base 19, and sides 20. Frame 14 also includes four uprights 22, each of which includes a plurality of evenly spaced mounting holes 24. As shown in greater detail in FIG. 2, mounting holes 24 correspond to mounting brackets 26 that may be integrally formed or removably attached to a panel 28. In the embodiment shown, two panels 28 are attached to the front 16 of frame 14. Panels 28 are a standard height 30, but may be any suitable size without departing from the invention.

In the embodiment shown, multiple cables 32 may be inserted into panel 28. Cables 32 are secured with glands 34 to prevent unwanted movement or disruption of the cables. In the embodiment shown, each panel 28 is an enclosure having an interior that provides cable organization and connections for multiple cables 32. Existing panels typically include a plurality of integrated cable openings, each of which provides a space for a single gland to attach. As such, the number of cables 32 that can enter panel 28 is limited by the panel's height 30 and length 31 and the number of integrated cable openings that fit within the height and length. In the present invention, the location of the integrated cable openings is replaced by a cable passage 36. In the embodiment shown, twelve cables 32 enter panel 28, but if cable passage 36 were replaced by holes for glands there would not be enough room to allow twelve glands 34 to be attached directly to panel 28. As shown, although panel 28 may be tall enough to accommodate two rows of glands 34, cable passage 36 is not wide enough to accommodate rows of six glands, as shown. Instead, a cable guide bracket 40 is positioned near cable passage 36 but spaced away from panel 28 such that a plurality of glands 34 can be attached to the cable guide bracket to secure cables 32 passing through the cable guide bracket and cable passage 36 into the panel. Of course, any suitable number of cables 32 and glands 34 may be used without departing from the invention.

Figure 4:
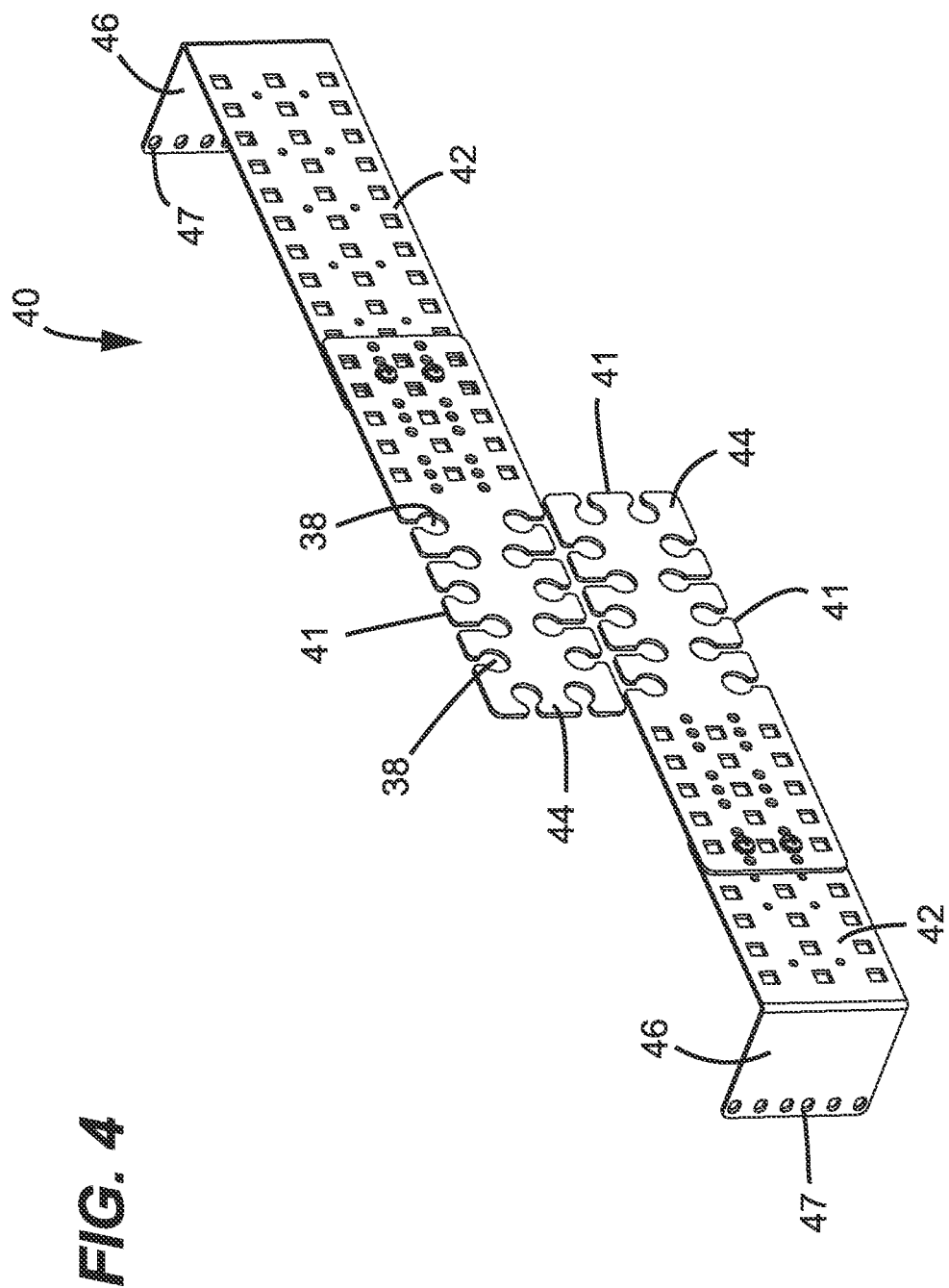
FIG. 4 is a perspective view of one embodiment of a cable guide bracket in accordance with the invention.
Figure 5:
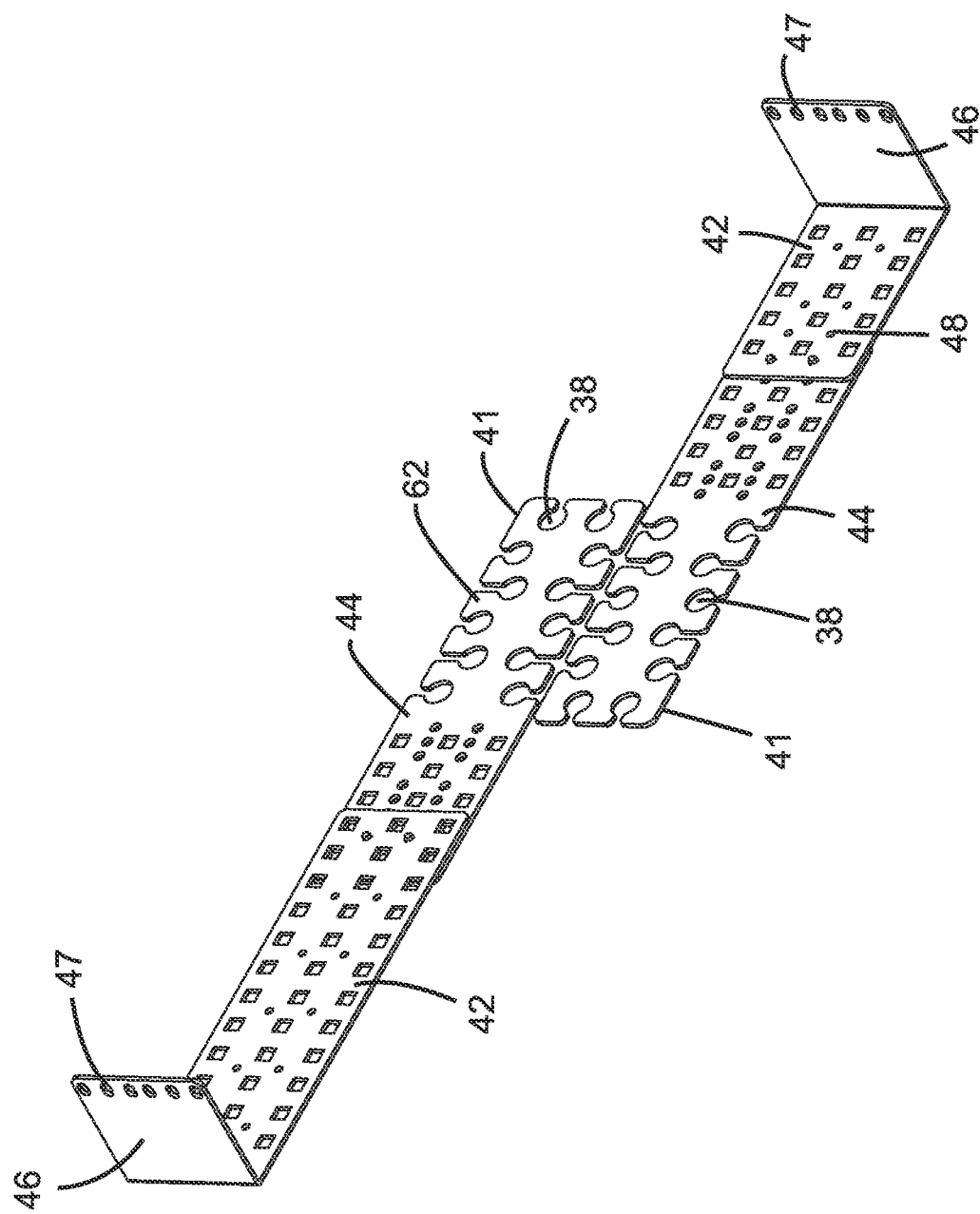
FIG. 5 is another perspective view of the cable guide bracket of FIG. 4.
Figure 6:
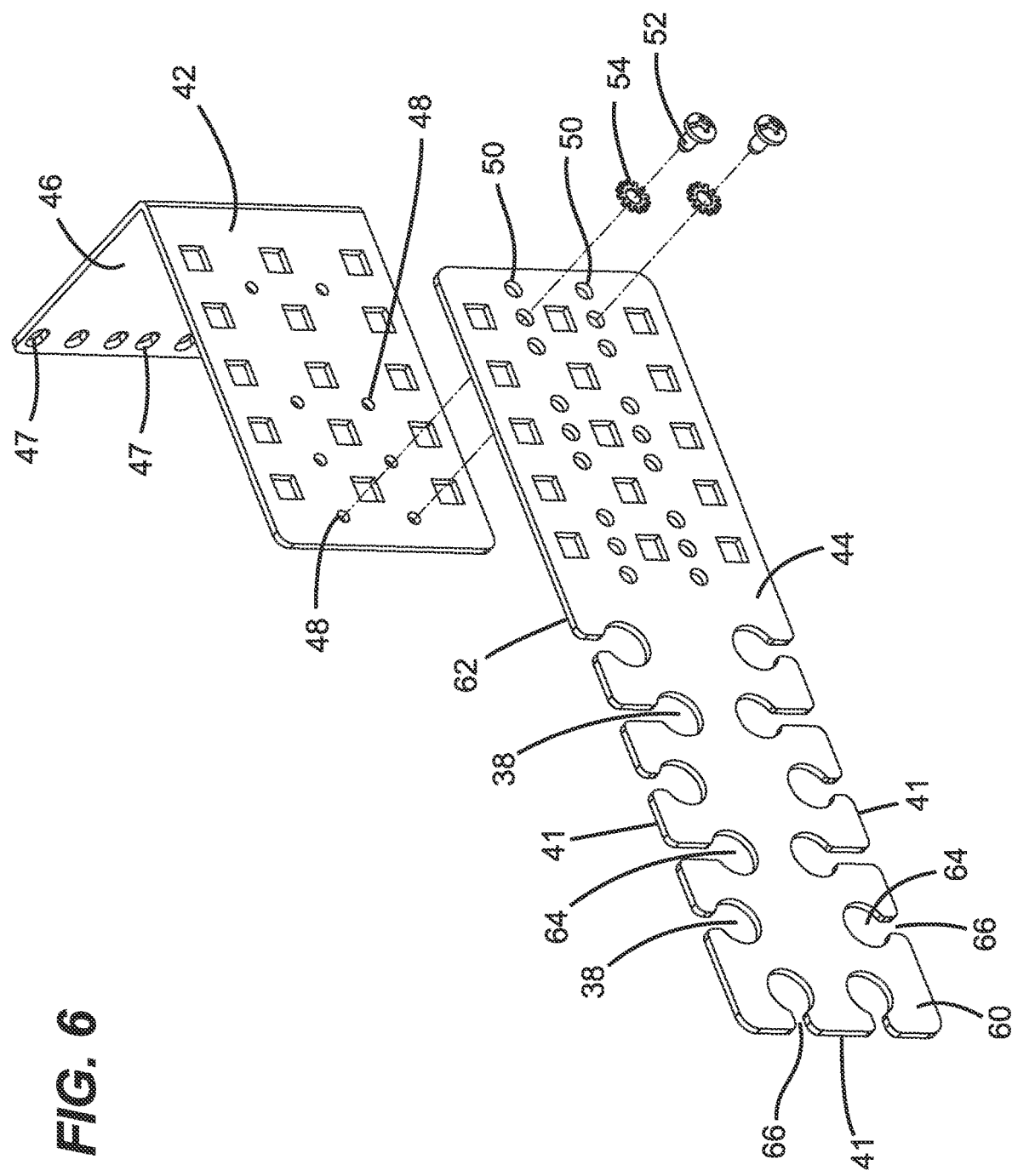
FIG. 6 is an exploded perspective view of the cable guide bracket of FIG. 4 showing a base portion separated from a cable guide portion.

As shown in FIGS. 4-6, cable guide bracket 40 includes a plurality of cable openings 38, sized to accommodate glands 34. Cable openings 38 are shown extending to an edge 41 of cable guide bracket 40, but the cable openings may have any suitable shape without departing from the invention. Each cable opening 38 is shaped to provide a secure surface onto which a gland 34 may be attached. As shown in FIG. 6, cable opening 38 includes a wide portion 64 and a narrow portion 66, with narrow portion positioned between edge 41 and wide portion 64.

Figure 9:
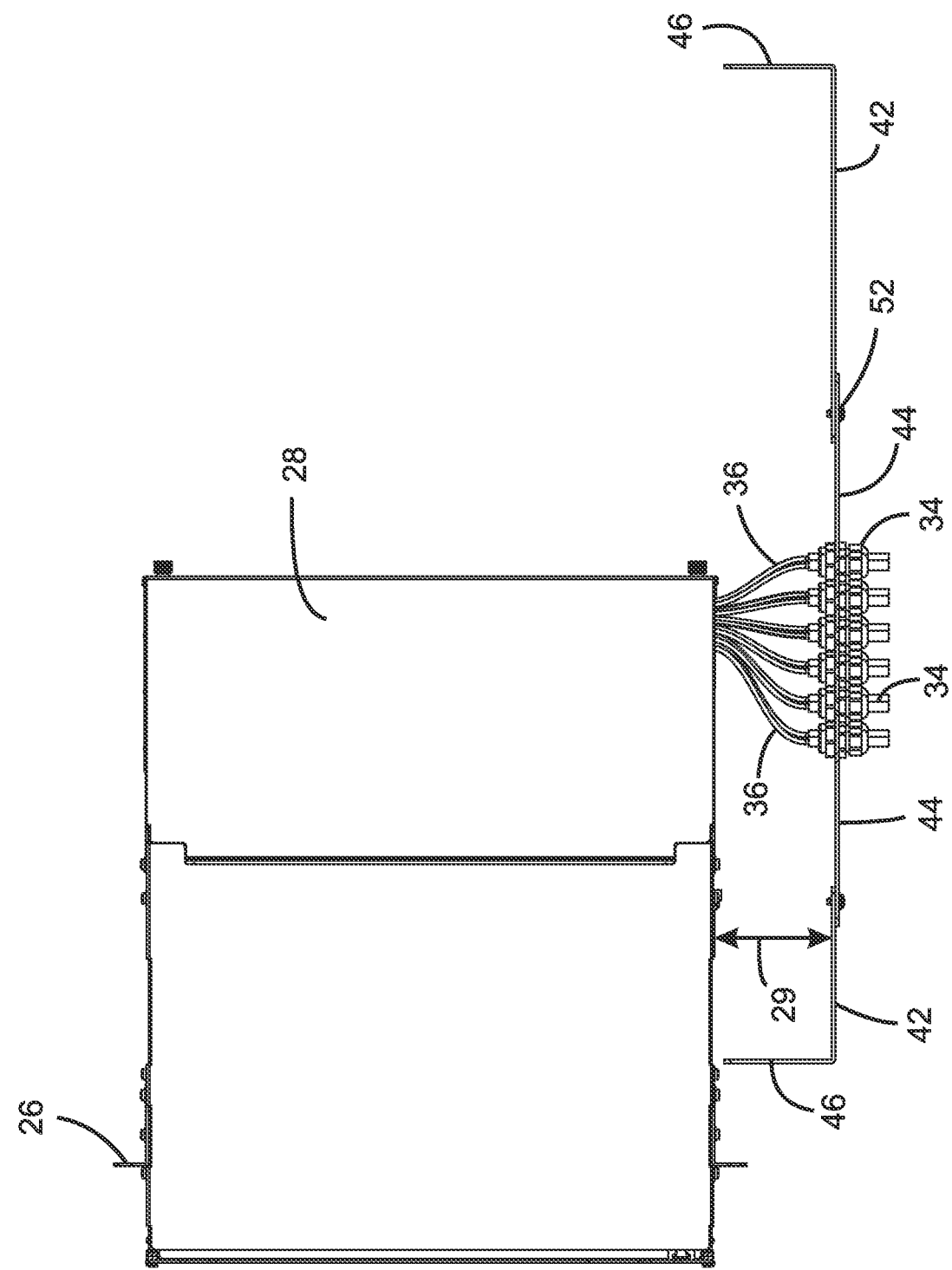
FIG. 9 is a top view of the system of FIG. 1.

In the embodiment shown, cable guide bracket 40 includes a base portion 42 and a cable guide portion 44. Cable guide portion 44 is generally planar and includes a first side 60 and opposite second side 62. Edge 41 extends along first side 60 and second side 62, with cable openings 38 passing through the first and second sides along the edge. Base portion 42 includes a mounting flange 46 that includes a plurality of mounting holes 47 that can be attached to rack 12 using any suitable fastener. Base portion 42 further includes a plurality of base holes 48 distributed throughout the base portion. Holes 48 correspond to guide portion holes 50, which allow cable guide portion 44 to be attached to base portion 42 in a variety of positions. This allows a user to adjust cable guide bracket 40 so that cable openings 38 are optimally positioned in relation to cable passage 36. As shown in FIG. 9, holes 48 may be threaded, allowing cable guide portion 44 to be attached to base portion 42 by machine screws 52 and locknuts 54. Any other suitable means of attachment may alternatively be used without departing from the invention.

Figure 7:
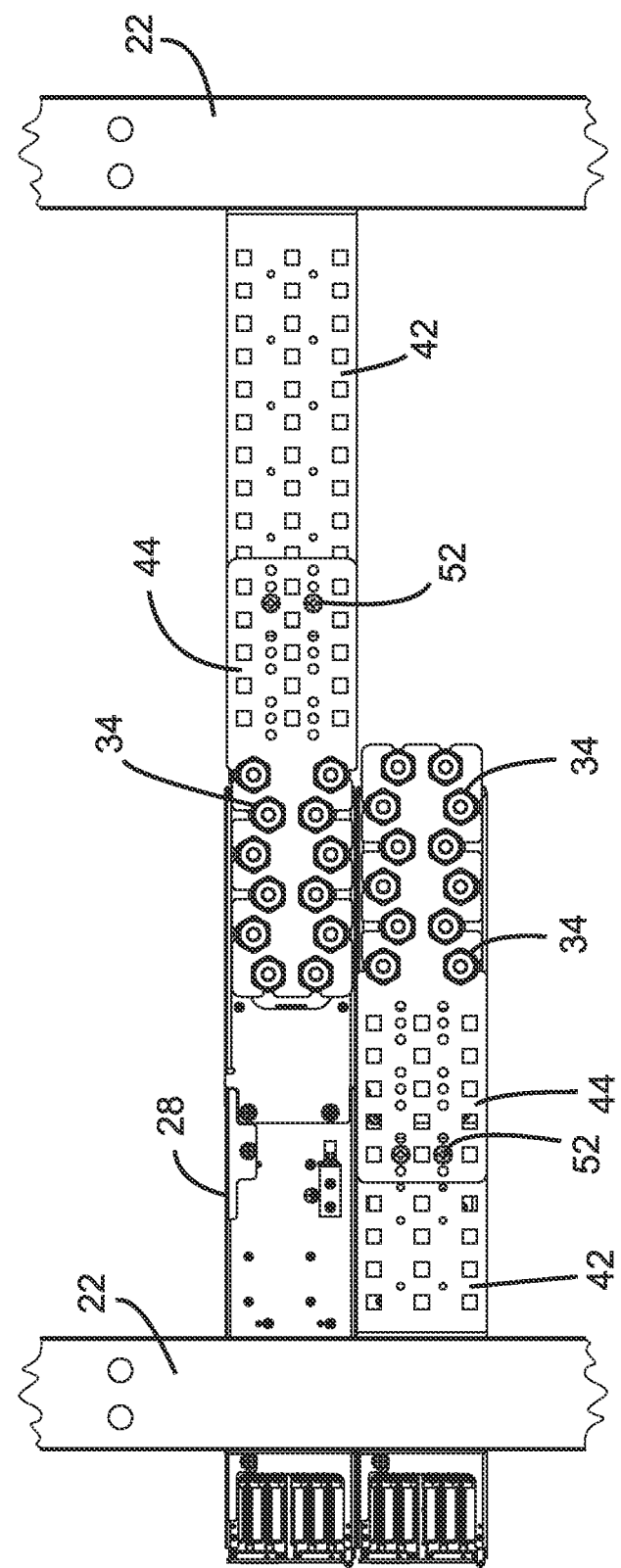
FIG. 7 is a side view of the system of FIG. 1.
Figure 8:
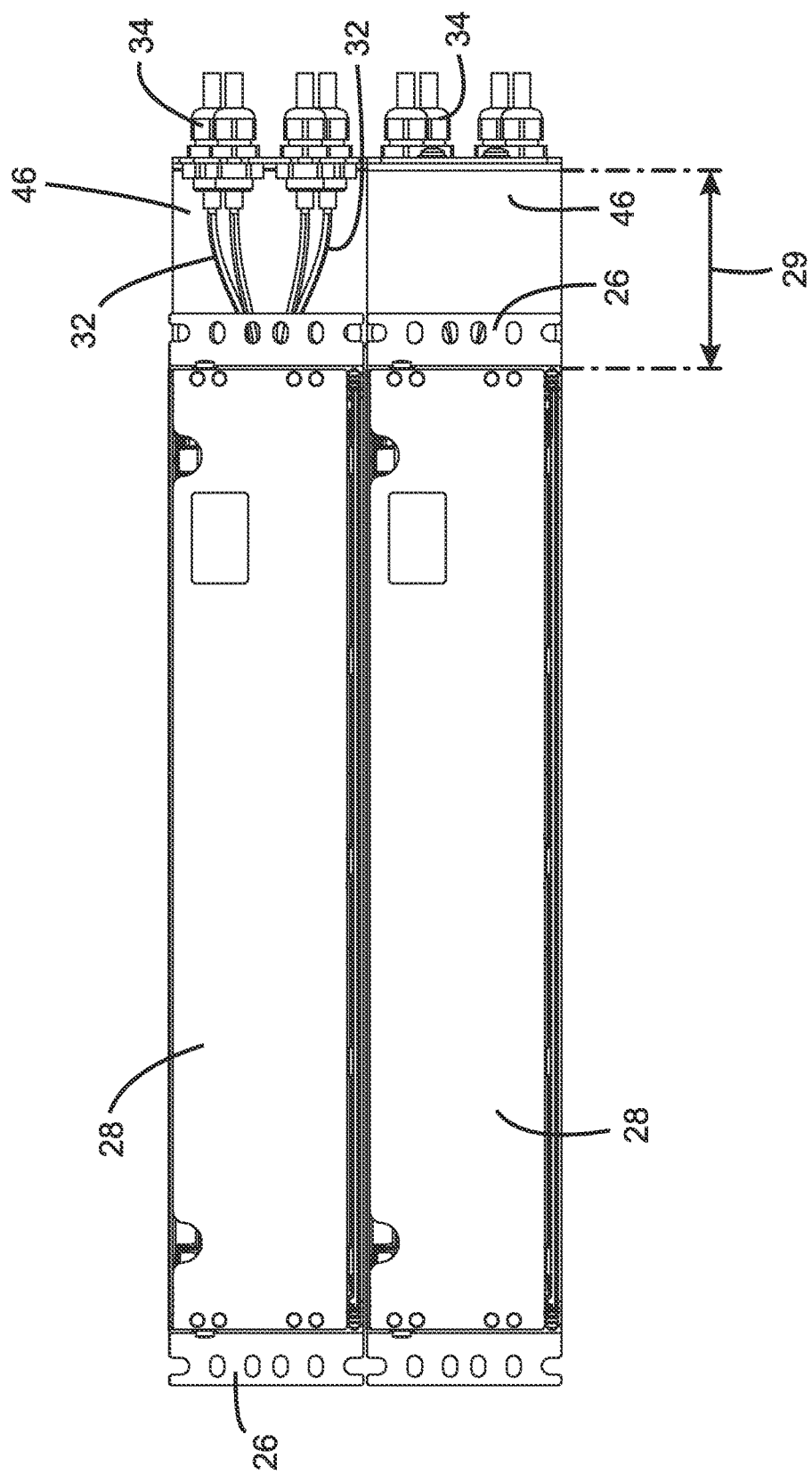
FIG. 8 is a front view of the system of FIG. 1.

Turning now to FIGS. 7-9, system 10 is shown in greater detail. In particular, as shown in FIGS. 8 and 9, cable guide portion 44 is spaced from and parallel to one side 20 of panel 28 by spaced distance 29. By orienting cable guide portion 44 spaced from and parallel to side 20, cables 32 pass through the cable guide bracket 40 perpendicular to the side, there is sufficient space between cable guide portion and side to accommodate a glands 34, and the cables do not need to bend significantly between the bracket and cable passage 36. As shown in FIG. 1, cables 32 approach cable guide bracket 40 from above and are bent approximately 90 degrees at the glands 34. Of course, cables 32 may approach cable guide bracket 40 from any suitable direction without departing from the invention. As shown, there is approximately a 90 degree bend before each cable 32 enters a gland 34, rather than having a significant bend between cable guide bracket 40 and cable passage 36, which allows multiple panels 28 to be stacked in rack 12 and may reduce strain on cables 32.

Figure 10:
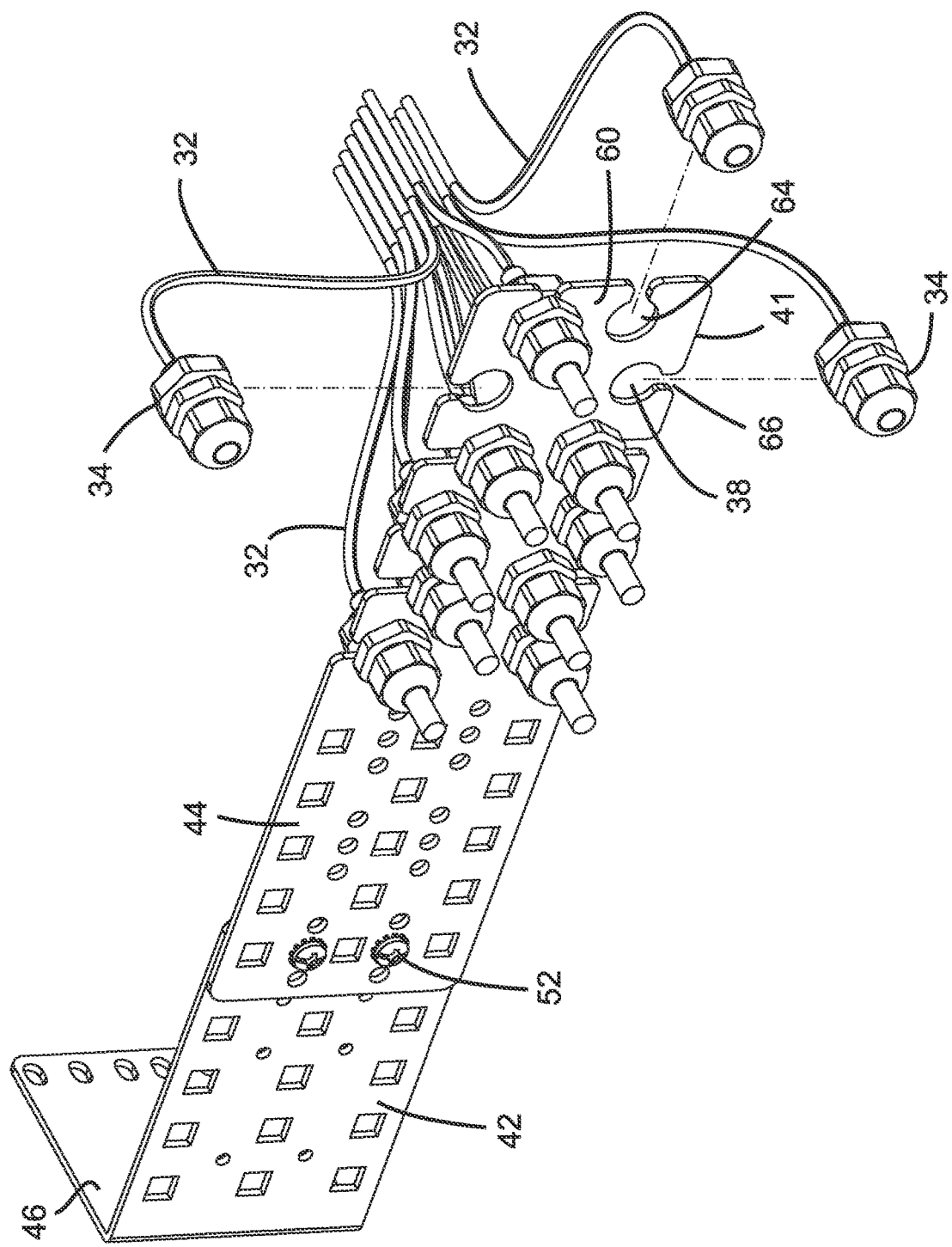
FIG. 10 is a partially exploded view of the cable guide bracket of FIG. 4, showing how a plurality of cables and glands are attached to the bracket.

Turning now to FIG. 10, cable guide bracket 40 is shown with a plurality of cables 32 and glands 34. As shown, three glands 34 and cables 32 are removed from cable openings 38 to illustrate how the glands and cables are installed onto or removed from the cable guide bracket. First, a cable 32 is passed through a gland 34. Next, the gland 34 and cable 32 are inserted into cable opening 38 together. As shown, the gland 34 passes through narrow portion 66 to rest in wide portion 64. Once gland 34 is fully inserted into cable opening 38, it may be tightened to secure the gland to cable guide portion 44 and to secure cable 32 within the gland.

Although the invention has been herein described in what is perceived to be the most practical and preferred embodiments, the invention is not intended to be limited to the specific embodiments set forth above. Rather, modifications may be made by one of skill in the art of the invention without departing from the spirit or intent of the invention.

What is claimed is:

1. A cable management system comprising:
   a panel having an interior and a plurality of sides, the panel including a cable passage disposed on one of the sides, the cable passage providing access to the interior;
   a cable guide bracket positioned spaced from and near the panel, the cable guide bracket including a cable opening, wherein each cable opening provides passage for one cable and is positioned parallel to one of the sides of the panel;
   a cable passing through one of the cable openings and further through the cable passage into the interior of the panel; and
   a cable gland attached to the cable, the cable gland further attached to the cable guide bracket to restrict movement of the cable in relation to the cable guide bracket.

2. The cable management system of claim 1, wherein the panel is attached to a frame.

3. The cable management system of claim 2, wherein the cable guide bracket is attached to the frame.

4. The cable management system of claim 1, wherein the cable guide bracket is attached to the panel.

5. The cable management system of claim 1, wherein the cable guide bracket includes a base portion adjustably attached to a cable guide portion and wherein the cable guide portion can be adjusted to align with the cable passage.

6. A method of attaching a plurality of cables comprising the steps of:
   providing a panel including an interior and a plurality of sides, the panel including a cable passage disposed on one of the sides, the cable passage providing access to the interior;
   positioning a cable guide bracket spaced from and near the panel, the cable guide bracket including a cable opening, wherein each cable opening provides passage for one cable and is positioned parallel to one of the sides of the panel;
   attaching a cable gland to the cable;
   passing the cable through the cable opening and further through the cable passage into the interior of the panel; and
   attaching the cable gland to the cable guide bracket to restrict movement of the cable in relation to the cable guide bracket.

7. A telecommunications cable management system comprising:
   a frame including a plurality of uprights;
   a panel mounted to at least two of the uprights, the panel including an interior and a plurality of sides, the panel including a cable passage disposed on one of the sides, the cable passage providing access to the interior;
   a cable guide bracket mounted to one of the uprights, the cable guide bracket including a planar portion defining a plurality of cable openings through the planar portion, the planar portion including an edge, wherein each cable opening extends to the edge, wherein each cable opening provides passage for a cable, wherein the planar portion is spaced from the side including the cable passage outside of the interior of the panel, wherein the planar portion is positioned parallel to the side including the cable passage;

a plurality of cables, at least one cable passing through one of the cable openings, the plurality of cables further passing through the cable passage into the interior of the panel; and a cable gland attached to each one of the cables of the plurality of cables, each of the cable glands attached to the cable guide bracket to restrict movement of the at least one cable in relation to the cable guide bracket.

8. The cable management system of claim 7, wherein the panel is attached to the frame at a location different from the cable guide bracket.

9. The cable management system of claim 7, wherein the planar portion of the cable guide bracket includes cable openings on opposite sides of the planar portion along the edge.

10. The cable management system of claim 7, wherein the cable guide bracket includes a base portion attached to a cable guide portion, wherein the cable guide portion can be adjusted in length.

11. A method of attaching a plurality of cables comprising the steps of:

providing at least one panel including an interior and a plurality of sides, the panel including a cable passage disposed on one of the sides, the cable passage providing access to the interior;

positioning a cable guide bracket spaced from and parallel to the panel, the cable guide bracket including a plurality of cable openings, wherein each cable opening provides passage for one cable;

passing a cable through at least one of the cable openings and further through the cable passage into the interior of the panel;

attaching a cable gland to the at least one cable; and attaching the cable gland to the cable guide bracket to restrict movement of the at least one cable in relation to the cable guide bracket.

12. A cable management system comprising:

a panel having an interior and a plurality of sides, the panel including a cable passage disposed on one of the sides, the cable passage providing access to the interior; and a cable guide bracket positioned spaced from and near the panel, the cable guide bracket including an edge and a cable opening extending to the edge, wherein each cable opening provides passage for a cable and is positioned parallel to one of the sides of the panel.

13. The cable management system of claim 12, further comprising a gland attached to the cable opening.

14. The cable management system of claim 13, wherein each cable opening is shaped to provide a gland attachment surface.

15. The cable management system of claim 13, wherein the cable opening includes a wide portion and a narrow portion.

16. The cable management system of claim 15, wherein the narrow portion is positioned between the edge and the wide portion.

17. The cable management system of claim 12, wherein cable guide bracket includes a base portion and a cable guide portion.

18. The cable management system of claim 17, wherein the cable guide portion is generally planar and includes a first side and opposite second side, wherein the edge extends along the first side and second side.

19. The cable management system of claim 18, wherein the cable openings pass through the first and second sides along the edge.

20. The cable management system of claim 17, wherein the base portion is oriented orthogonal to the cable guide portion.

* * * * *